(12) United States Patent
Uematsu et al.

(10) Patent No.: US 7,002,324 B2
(45) Date of Patent: Feb. 21, 2006

(54) SWITCHING POWER SUPPLY CONTROL CIRCUIT AND SWITCHING POWER SUPPLY USING SAME

(75) Inventors: Takeshi Uematsu, Chuo-ku (JP); Takakazu Imai, Chuo-ku (JP); Hiroshi Kawasaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 210 days.

(21) Appl. No.: 10/383,967

(22) Filed: Mar. 7, 2003

(65) Prior Publication Data

US 2003/0173937 A1 Sep. 18, 2003

(30) Foreign Application Priority Data

Mar. 15, 2002 (JP) ..................................... 2002-071199

(51) Int. Cl.
*G05F 1/40* (2006.01)
*H02M 7/00* (2006.01)

(52) U.S. Cl. .......................... 323/272; 323/282; 363/71
(58) Field of Classification Search .................. 363/71, 363/95, 98, 34, 37, 39, 65, 56.11; 323/222, 323/272, 285, 273, 275, 282
See application file for complete search history.

(56) References Cited

U.S. PATENT DOCUMENTS

| | | | | |
|---|---|---|---|---|
| 5,212,630 A | * | 5/1993 | Yamamoto et al. | 363/71 |
| 5,473,528 A | * | 12/1995 | Hirata et al. | 363/71 |
| 6,329,801 B1 | | 12/2001 | Zuniga et al. | 323/285 |
| 6,515,460 B1 | * | 2/2003 | Farrenkopf | 323/272 |

* cited by examiner

*Primary Examiner*—Rajnikant B. Patel
(74) *Attorney, Agent, or Firm*—Seed IP Law Group PLLC

(57) ABSTRACT

This invention provides a switching power supply control circuit based on the parallel operation scheme that suppresses ripples in the output voltage. The control circuit comprises switching circuit blocks 10 and 20 connected in parallel, output reactors 31 and 32 connected in parallel corresponding to the switching circuit blocks 10 and 20, and a control circuit 40 that controls the operation of the switching circuit blocks 10 and 20. The control circuit 40 comprises: means of calculating the difference between the reactor currents $I_{L1}$ and $I_{L2}$ flowing through the output reactors 31 and 32 and the average value of the reactor currents, means of generating control voltages $V_{o1}$ and $V_{o2}$ corresponding to the switching circuit blocks 10 and 20 based on the calculated differences and the output voltage $V_{op}$ comparators 48 and 49 that compare the control voltages $V_{o1}$ and $V_{o2}$ against the reference voltage $V_{ref}$ and latch circuits 51 and 52 that latch the outputs of the comparators 48 and 49 in response to the clock signal CLK.

18 Claims, 4 Drawing Sheets

SWITCHING POWER SUPPLY CONTROL CIRCUIT AND SWITCHING POWER SUPPLY USING SAME

BACKGROUND OF THE INVENTION

The present invention relates to a switching power supply control circuit and a switching power supply using same, and particularly to a control circuit that performs digital control of a switching power supply and a switching power supply using same.

DESCRIPTION OF THE PRIOR ART

Switching power supplies are conventionally used in computers, home electronics, automobiles and various other products. Typical switching power supplies are units (DC/DC converters) that first use switching circuits to convert a DC input to AC and then convert it back to DC, and thus it is possible to obtain DC output of a different voltage than the input voltage.

With such a switching power supply, a control circuit is used to detect the output voltage and the switching operation is controlled by the switching circuit based thereupon. Thereby, the switching power supply supplies a stable operating voltage to the load to be driven.

One known conventional method of providing a large stable supply of power to a load is the so-called parallel operation scheme wherein a plurality of switching power supplies is connected in parallel. The parallel operation scheme can be used to supply the load with output current proportional to the number of switching power supplies connected in parallel, so this scheme is particularly suited to the driving of a central processing unit (CPU), digital signal processor (DSP) or other load that demands low voltage and high current.

On the other hand, in recent years there have been attempts to use digital circuits for some or all of the control circuits for purposes such as miniaturizing the circuit size and the like.

SUMMARY OF THE INVENTION

However, according to the research conducted by the present inventors, it was found that when digital control is used for switching power supplies based on the parallel operation scheme, ripples often occur in the output voltage. To wit, while ripples in the output voltage can be adequately suppressed by increasing the operating frequency of the control circuit when switching power supplies are used alone, in a switching power supply based on the parallel operation scheme, it was found that ripples could not be adequately reduced despite increasing the operating frequency of the control circuit.

It is therefore an object of the present invention to provide a control circuit that performs digital control of a switching power supply based on the parallel operation scheme, and that is also a control circuit that can control ripples in the output voltage.

Another object of the present invention is to provide a switching power supply based on the parallel operation scheme that suppresses ripples in the output voltage.

An object of the present invention is achieved by a control circuit that controls a switching power supply including a plurality of switching circuit blocks and a plurality of output reactors connected in parallel to an associated one of the switching circuit blocks, comprising: a voltage control loop that stabilizes the output voltage of the switching power supply, and a current control loop that balances the reactor currents flowing through each of the plurality of output reactors without interfering the voltage control loop.

In a preferred embodiment of the present invention, the current control loop performs compensation on the current control loop based on the difference between the reactor currents flowing through the plurality of output reactors and the average value of the reactor currents flowing through the plurality of output reactors.

In another preferred embodiment of the present invention, the current control loop; performs compensation on the voltage control loop such that when the reactor current flowing through a stipulated output reactor among the plurality of output reactors is less than the average value, power transmission is increased by the switching circuit block corresponding to the stipulated output reactor among the plurality of output reactors, and performs compensation on the voltage control loop such that when the reactor current flowing through the stipulated output reactor is greater the average value, power transmission is decreased by the switching circuit block corresponding to the stipulated output reactor.

In another preferred embodiment of the present invention, the responsiveness of the current control loop is lower than the responsiveness of the voltage control loop.

An object of the present invention is also achieved by a control circuit that controls a switching power supply including a plurality of switching circuit blocks and a plurality of output reactors connected in parallel to an associated one of the switching circuit blocks, comprising a calculator that calculates the difference between the reactor currents flowing through the plurality of output reactors and the average value of the reactor currents flowing through the plurality of output reactors, respectively, a control voltage generator that generates control voltages corresponding to each of the plurality of switching circuit blocks based on the calculated difference and the output voltage of the switching power supply, a plurality of comparators that compare the control voltages against a reference voltage, and a plurality of latch circuits that latch the outputs of the comparators in response to a clock signal.

In a preferred embodiment of the present invention, the calculator includes a low-pass filter that reduces responsiveness.

In another preferred embodiment of the present invention, the low-pass filter has the characteristic of cutting off the frequency of the clock signal.

An object of the present invention is also achieved by a switching power supply comprising: a plurality of switching circuit blocks, a plurality of output reactors connected in parallel to an associated one of the switching circuit blocks, a control circuit that controls the operation of the plurality of switching circuit blocks, wherein: the control circuit comprises: a voltage control loop that stabilizes the output voltage of the switching power supply, and a current control loop that balances the reactor currents flowing through each of the plurality of output reactors without interfering the voltage control loop.

An object of the present invention is also achieved by a switching power supply comprising: a plurality of switching circuit blocks, a plurality of output reactors connected in parallel to an associated one of the switching circuit blocks, a control circuit that controls the operation of the plurality of switching circuit blocks, wherein: the control circuit comprises: a calculator that calculates the difference between the reactor currents flowing through the plurality of output reactors and the average value of the reactor currents flowing through the plurality of output reactors, respectively, a control voltage generator that generates control voltages corresponding to each of the plurality of switching circuit blocks based on the calculated difference and the output voltage of the switching power supply, a plurality of comparators that compare the control voltages against a reference voltage, and a plurality of latch circuits that latch the outputs of the comparators in response to a clock signal.

In a preferred embodiment of the present invention, the calculator includes a low-pass filter that reduces responsiveness.

In another preferred embodiment of the present invention, the low-pass filter has the characteristic of cutting off the frequency of the clock signal.

With the present invention, the reactor currents flowing through each of the output reactors are balanced, so it is possible to suppress ripples in switching power supplies based on the parallel operation scheme.

The above and other objects and features of the present invention will become apparent from the following description made with reference to the accompanying drawings.

DESCRIPTION OF THE PREFERRED EMBODIMENTS

Here follows a detailed description of a preferred embodiment of the present invention made with reference to the appended drawings.

Figure 1:
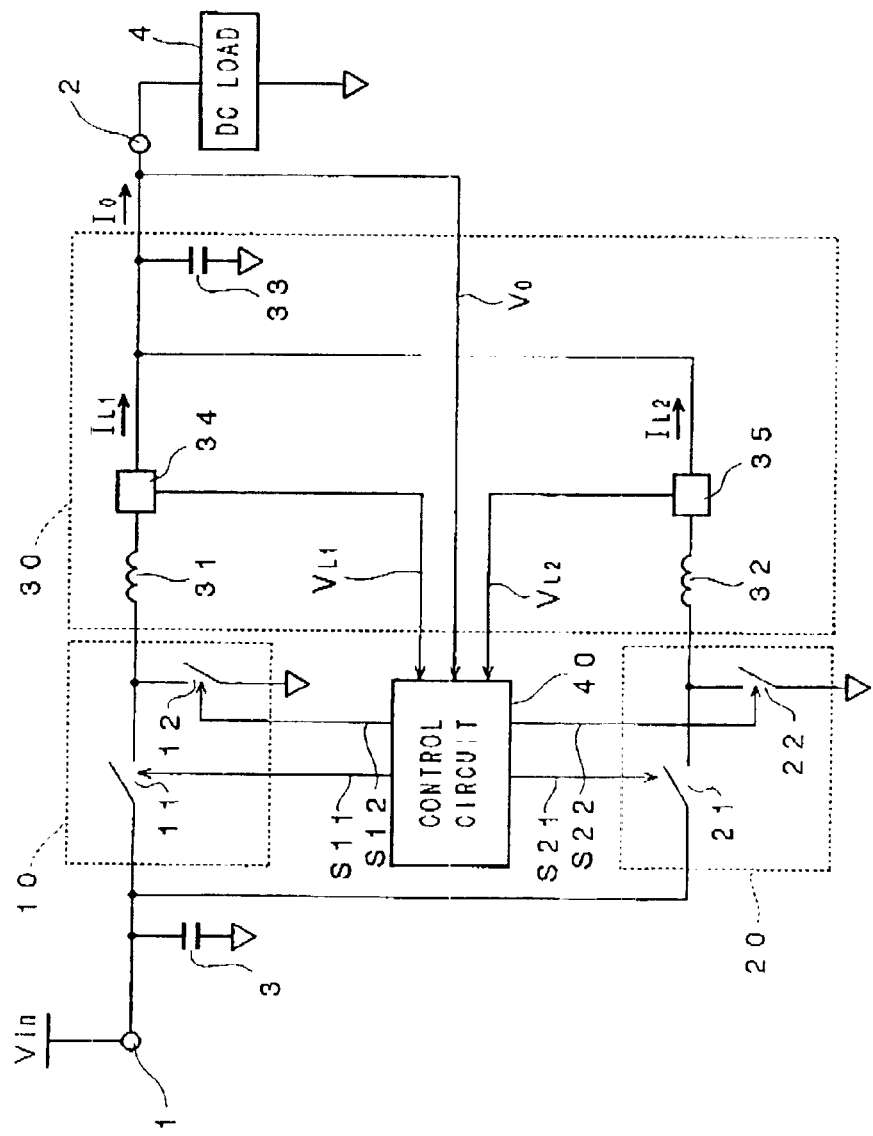
FIG. 1 is a circuit diagram of the switching power supply according to a preferred embodiment of the present invention.

FIG. 1 is a circuit diagram of the switching power supply according to a preferred embodiment of the present invention.

As shown in FIG. 1, the switching power supply according to this embodiment is a unit that steps down the DC input voltage $V_{in}$ supplied to input power terminal 1 and generates the DC output voltage $V_n$ which is supplied to output power terminal 2, consisting of switching circuit blocks 10 and 20, control circuit block 30 and control circuit 40. To wit, the switching power supply according to this embodiment is a switching power supply based on the parallel operation scheme, and a CPU or other DC load 4 that requires a large current is connected to the output power terminal 2.

The switching circuit block 10 has switch elements 11 and 12, while the output circuit block 20 has switch elements 21 and 22. Switch elements 11 and 21 are both connected in series between the input capacitor 3 and control circuit block 30. Switch element 12 is connected between the ground and the point of contact between switch element 11 and the control circuit block 30. Switch element 22 is connected between the ground and the point of contact between switch element 21 and the control circuit block 80. These switch elements 11 and 12 are turned on alternately after a stipulated amount of dead time under the control of the control circuit 40. Similarly, the switch elements 21 and 22 are turned on alternately after a stipulated amount of dead time under the control of the control circuit 40.

The output circuit block 30 consists of output reactors 31 and 32, an output capacitor 33 and reactor current detection circuits 34 and 35. The output reactor 31 is connected in series between switching circuit block 10 and output power terminal 2, while output reactor 32 is connected in series between switching circuit block 20 and output power terminal 2. In addition, output capacitor 33 is connected between output capacitor 33 and the ground. Moreover, the reactor current detection circuit 34 is connected in series with output reactor 31 and generates a detection voltage $V_{L1}$ based on the reactor current $I_{L1}$ flowing through the output reactor 31. Similarly, the reactor current detection circuit 35 is connected in series with output reactor 32 and generates a detection voltage $V_{L2}$ based on the reactor current $I_{L2}$ flowing through the output reactor 32. These detection voltages $V_{L1}$ and $V_{L2}$ are supplied to the control circuit 40 together with the output voltage $V_o$.

Figure 2:
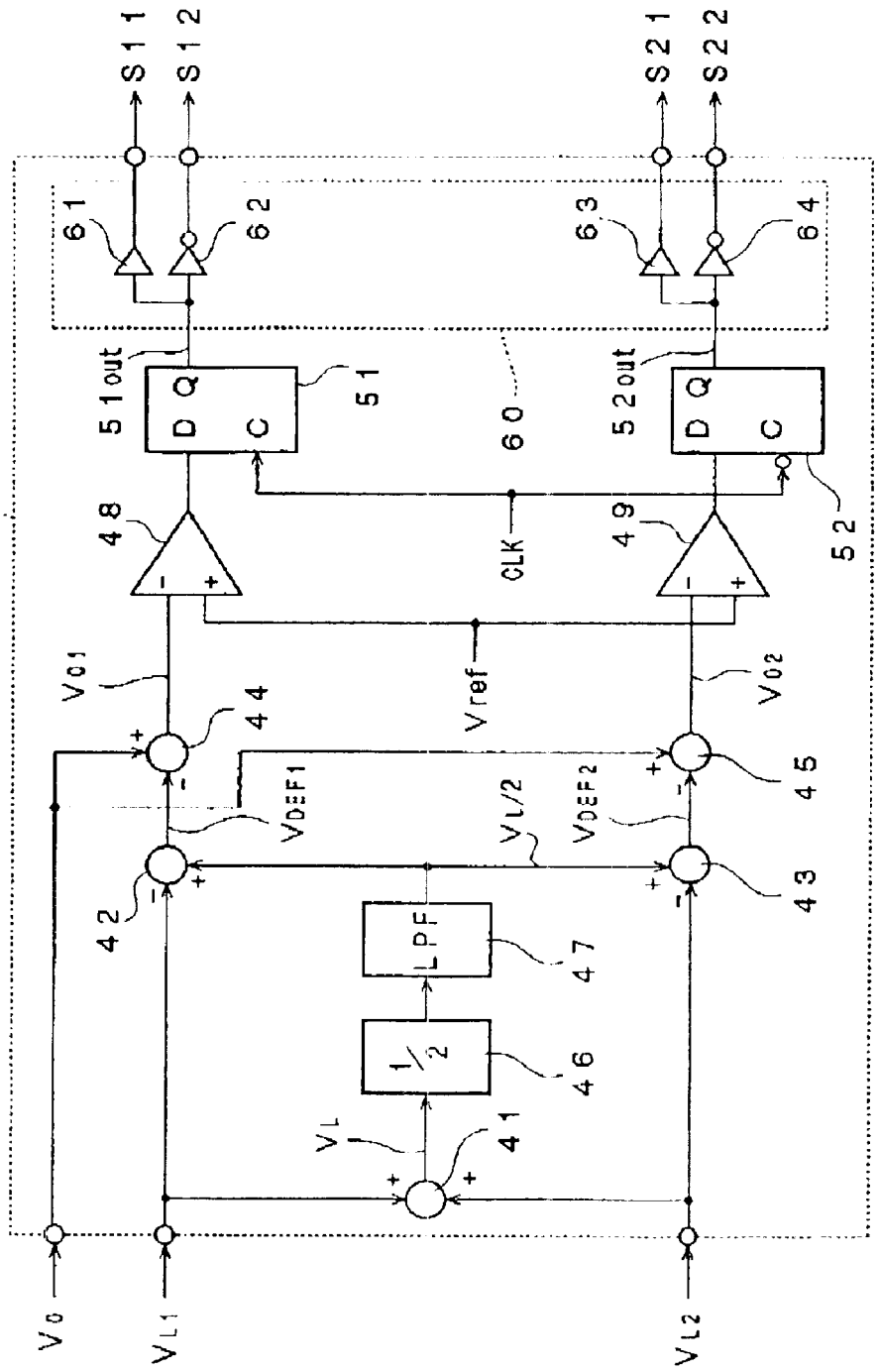
FIG. 2 is a circuit diagram of the control circuit 40.

FIG. 2 is a circuit diagram of the control circuit 40.

As shown in FIG. 2, the control circuit 40 consists of an adder 41, subtracters 42–45, ½ circuit 46, low-pass filter 47, comparators 48 and 49, latch circuits 51 and 52 and a driver circuit 60.

The adder 41 receives the detection voltage $V_{L1}$ from the reactor current detection circuit 34 and the detection voltage $V_{L2}$ from the reactor current detection circuit 35 and supplies its output $V_L$ to the ½ circuit 46.

The ½ circuit 46 is a circuit that receives the output $V_L$ from the adder 41 and generates a voltage with a value one-half (½) of it. Accordingly, the output voltage $V_L/2$ of the ½ circuit 46 is supplied to the low-pass filter 47, where the low-pass filter 47 removes high frequency components contained therein. While this is described in detail later, the filter characteristics of the low-pass filter 47 preferably include the characteristic of being able to adequately cut off response frequencies of the voltage-control loop. The output from the low-pass filter 47 is supplied to both subtracters 42 and 43.

Subtracter 42 is a circuit that subtracts the output voltage of the low-pass filter 47 from the detection voltage $V_{L1}$ and supplies the output to subtracter 44. Similarly, subtracter 43 is a circuit that subtracts the output voltage of the low-pass filter 47 from the detection voltage $V_{L2}$ and supplies the output to subtracter 45. As described above, the output voltage of the low-pass filter 47 is equivalent to a voltage found by filtering the average value $V_L/2$ of detection voltage $V_{L1}$ and detection voltage $V_{L2}$, so the output voltage $V_{DEF1}$ of subtracter 42 will indicate the amount of estrangement of the detection voltage $V_{L1}$ from the average value, while the output voltage $V_{DEF2}$ of subtracter 43 will indicate the amount of estrangement of the detection voltage $V_{L2}$ from the average value. In this case, this means that the greater the absolute value of these output voltages $V_{DEF1}$ and $V_{DEF2}$, the greater the unbalance between reactor currents $I_{L1}$ and $I_{L2}$.

Subtracter 44 is a circuit that subtracts the output voltage $V_{DEF1}$ of subtracter 42 from the output voltage $V_o$ and its output which is the control voltage $V_{o1}$ is supplied to the inverted input terminal (−) of comparator 48. Similarly, subtracter 45 is a circuit that subtracts the output voltage $V_{DEF2}$ of subtracter 43 from the output voltage $V_o$ and its output which is the control voltage $V_{o2}$ is supplied to the inverted input terminal (−) of comparator 49.

Comparator 48 is provided with an inverted input terminal (−) and a non-inverted input terminal (+), and control voltage $V_{o1}$ from subtracter 44 is supplied to the inverted input terminal (−) and a reference voltage $V_{ref}$ is supplied to the non-inverted input terminal (+). Similarly, comparator 49 is provided with an inverted input terminal (−) and a non-inverted input terminal (+), and control voltage $V_{o2}$ from subtracter 45 is supplied to the inverted input terminal (−), and the reference voltage $V_{ref}$ is supplied to the non-inverted input terminal (+). Here, the reference voltage $V_{ref}$ is defined to be the target value of the output voltage $V_o$ and accordingly, when control voltage $V_{o1}$ or $V_{o2}$ drops below the target value, the output of comparator 48 or 49 assumes the high (H) level but when control voltage $V_{o1}$ or $V_{o2}$ exceeds the target value, the output of comparator 48 or 49 assumes the low (L) level.

Latch circuit 51 latches the output from the comparator 48 supplied to its data input terminal (D), synchronized to the leading edge of clock signal CLK supplied to its clock terminal (C), and outputs this value to its data output terminal (Q). On the other hand, latch circuit 52 latches the output from the comparator 49 supplied to its data input terminal (D), synchronized to the trailing edge of clock signal CLK supplied to its clock terminal (C), and outputs this value to its data output terminal (Q). Accordingly, the phases of the output ($51_{out}$) of latch circuit 51 and output ($52_{out}$) of latch circuit 52 are shifted by 180° from each other. The outputs ($51_{out}$ and $52_{out}$) of latch circuits 51 and 52 are supplied to the driver circuit 60.

The driver circuit 60 consists of buffers 61 and 63 and inverters 62 and 64. Drive signals S11, S12, S21 and S22 which are the outputs of the buffer 61, inverter 62, buffer 63 and inverter 64 are supplied to switch elements 11, 12, 21 and 22 respectively. These switch elements 11, 12, 21 and 22 are turned on when the corresponding drive signals S11, S12, S21 and S22 are at the high (H) level and turned off when the signals are at the low (L) level.

While this is no particular limitation, among the various elements that make up the control circuit 40, the adder 41, subtracters 42-46, 112 circuit 46, low-pass filter 47, comparators 48 and 49 and latch circuits 51 and 52 do not require large amounts of drive power, so they are preferably integrated into a single semiconductor chip.

Here follows a description of the operation of the switching power supply according to this embodiment.

Figure 3:
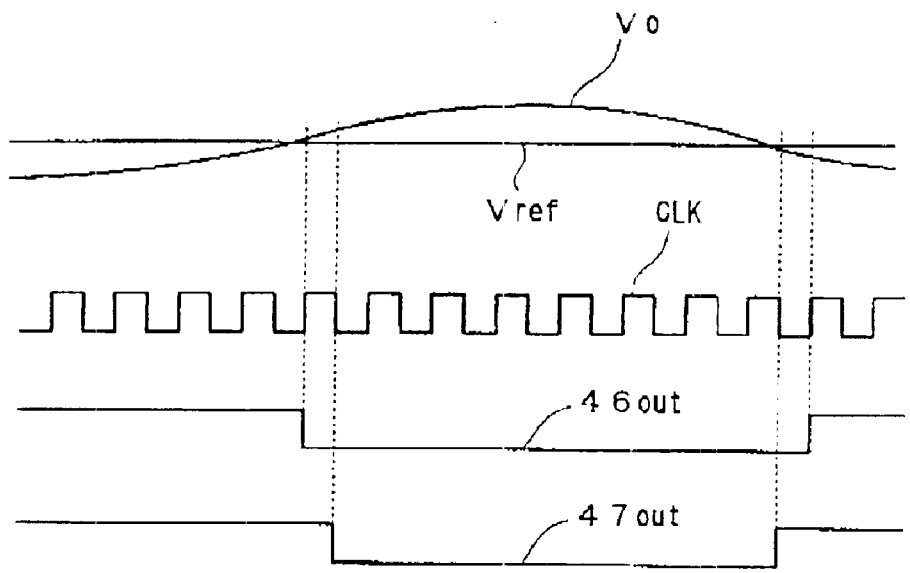
FIG. 3 is a timing chart showing the operation of the control circuit 40 shown in FIG. 2.

The switching power supply according to this embodiment differs from an ordinary switching power supply based on PWM control in that control is performed by means of so-called delta-sigma modulation. As is well known, with PWM control, stabilization of the output voltage $V_o$ is achieved by adjusting the duty while keeping the switching frequency constant. However, as shown in FIG. 3, with delta-sigma modulation, stabilization of the output voltage $V_o$ is achieved, depending on the output voltage $V_o$ by keeping the switch element 11 (21) in the on state (with switch element 12 (22) in the off state) over a plurality of contiguous clock cycles, or by keeping the switch element 11 (21) in the off state (with switch element 12 (22) in the on state) over a plurality of contiguous clock cycles. Accordingly, the switching frequency with respect to the switching circuit blocks 10 or 20 is not constant and for this reason, unless the frequency of the clock signal CLK is set sufficiently high, large ripples may occur in the output voltage $V_o$.

Specifically, the frequency $f_C$ of the clock signal CLK must at least satisfy the following condition:

$$f_c \rangle 10 \cdot \frac{1}{2\pi\sqrt{LC}} \quad (1)$$

where L is the reactance of output reactor 31 (32) and C is the capacitance of output capacitor 33.

Here, with the switching power supply according to this embodiment, there are two control loops: one based on the output voltage $V_o$ (a loop that does not use the output voltage $V_{DEF1}$ of the subtracter 42 or the output voltage $V_{DEF2}$ of the subtracter 43; called the "voltage control loop" in this Specification) and one based on reactor currents $I_{L1}$ and $I_{L2}$ (a loop that does use the output voltage $V_{DEF1}$ of the subtracter 42 or the output voltage $V_{DEF2}$ of the subtracter 43; called the "current control loop" in this Specification).

The voltage control loop is a loop that applies feedback of fluctuations in the output voltage $V_o$ commonly to both switching circuit blocks 10 and 20, and control is exerted such that the output voltage $V_o$ is stabilized to the target value.

The current control loop is a loop that controls switching circuit blocks 10 and 20 based on differences from the reactor current $I_{L1}$ and reactor current $I_{L2}$. Specifically, power transmission increases in the switching circuit block on the side with the smaller reactor current, while power transmission decreases in the switching circuit block on the side with the larger reactor current. Thereby, any unbalance between reactor current $I_{L1}$ and reactor current $I_{L2}$ is suppressed, so it is possible to reduce ripples arising from the unbalance in reactor current.

In this case, the responsiveness of the voltage control loop is determined by means of the frequency of the clock signal CLK, but the responsiveness of the current control loop is suppressed by the presence of the low-pass filter 47, so the responsiveness of the current control loop becomes sufficiently low in comparison to the responsiveness of the voltage control loop. To wit, in this embodiment, interference between the two control loops is eliminated. Accordingly, stabilization of the output voltage $V_o$ and balancing of the reactor current may be achieved simultaneously, so control of one need not disturb control of the other.

In this manner, with the switching power supply according to this embodiment, any unbalance between reactor current $I_{L1}$ and reactor current $I_{L2}$ can be suppressed, so it is possible to reduce ripples arising therefrom and also, the operation of balancing the reactor currents does not interfere with the operation of stabilizing the output voltage $V_o$.

The present invention is in no way limited to the aforementioned embodiments, but rather various modifications are possible within the scope of the invention as recited in the claims, and naturally these modifications are included within the scope of the invention.

For example, in the embodiment described above, two sets of switching circuit blocks and output reactors are provided and connected in parallel, but the number of sets of switching circuit blocks and output reactors provided in parallel according to the present invention is not limited to two, but rather, it is also possible to use three or more sets of switching circuit blocks and output reactors which are connected in parallel. In this case, the ½ circuit 46 may be replaced by a ⅓ circuit, ¼ circuit or the like to find the average value of the reactor current.

In addition, with a switching power supply according to any of the embodiments described above, comparators 48 and 49 are used to directly compare control voltages $V_{o1}$ and $V_{o2}$ against the reference voltage $V_{ref}$, and thus perform the comparison of the current output voltage $V_o$ against the target value, but this comparison of the current output voltage $V_o$ against the target value may also be performed by using a voltage divider circuit containing a resistor to perform voltage division on the output voltage $V_o$ or control voltage $V_{o1}$ or $V_{o2}$, and comparing the voltage thus obtained against the reference voltage $V_{ref}$.

Figure 4:
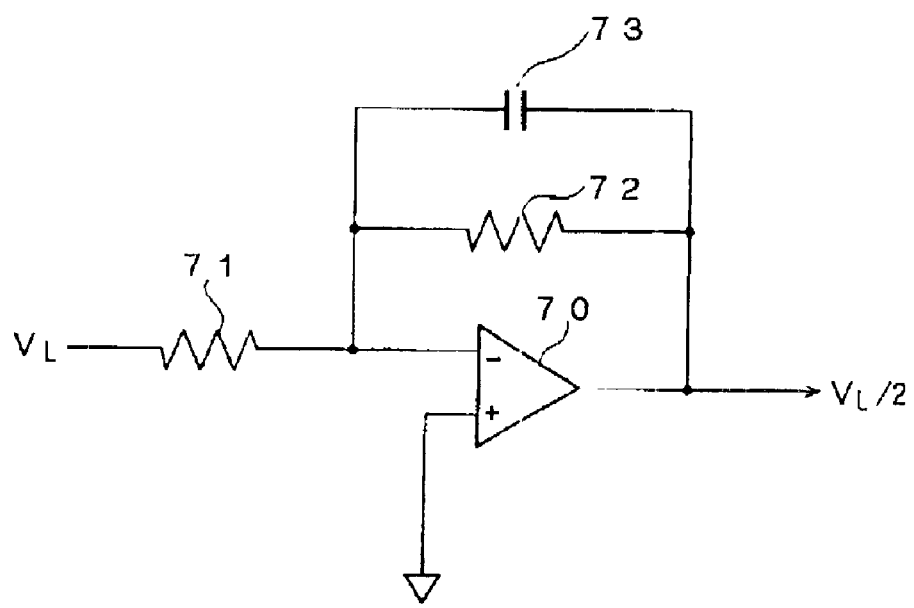
FIG. 4 is a circuit diagram showing an example of a circuit that implements the functions of the portion consisting of the ½ circuit 46 and the low-pass filter 47.

In addition, with a switching power supply according to any of the embodiments described above, the ½ circuit 46 and low-pass filter 47 are illustrated as separate circuits, but as shown in FIG. 4, it is also possible to provide an operational amplifier (op amp) 70 and set the ratio (72R/71R) of the resistance value 72R of resistor 72 to the resistance value 71R of resistor 71 connected to the op amp to ½, and thus implement the functions in the portion corresponding to the ½ circuit 46 and low-pass filter 47.

As described above, with the present invention, it is possible to suppress ripples in a switching power supply based on the parallel operation scheme by an extremely simple method.

What is claimed is:

1. A control circuit that controls a switching power supply having a plurality of switching circuit blocks and a plurality of output reactors connected in parallel to an associated one of the switching circuit blocks, the control circuit comprising:
    a voltage control loop that stabilizes an output voltage of the switching power supply;
    a current control loop that balances the reactor currents flowing through each of the plurality of output reactors without interfering with the voltage control loop; and
    the voltage control loop and the current control loop configured to use delta-sigma modulation to control the switching power supply.

2. The control circuit as claimed in claim 1, wherein the current control loop performs compensation on the current control loop based on a difference between the reactor currents flowing through the plurality of output reactors and an average value of the reactor currents flowing through the plurality of output reactors.

3. The control circuit as claimed in claim 2, wherein the current control loop:
    performs compensation on the voltage control loop such that when the reactor current flowing through a stipulated output reactor among the plurality of output reactors is less than the average value, power transmission is increased by the associated switching circuit block, and
    performs compensation on the voltage control loop such that when the reactor current flowing through the stipulated output reactor is greater than the average value, power transmission is decreased by the associated switching circuit block.

4. The control circuit as claimed in claim 1, wherein a responsiveness of the current control loop is lower than a responsiveness of the voltage control loop.

5. The control circuit as claimed in claim 2, wherein a responsiveness of the current control loop is lower than a responsiveness of the voltage control loop.

6. The control circuit as claimed in claim 3, wherein a responsiveness of the current control loop is lower than a responsiveness of the voltage control loop.

7. A control circuit that controls a switching power supply including a plurality of switching circuit blocks and a plurality of output reactors connected in parallel to an associated one of the switching circuit blocks, comprising:
    a calculator that calculates a difference between reactor currents flowing through the plurality of output reactors and an average value of the reactor currents flowing through the plurality of output reactors, respectively;
    a control voltage generator that generates control voltages corresponding to each of the plurality of switching circuit blocks using delta-sigma modulation and based on the calculated difference and an output voltage of the switching power supply;
    a plurality of comparators that compare the control voltages against a reference voltage; and
    a plurality of latch circuits that latch the outputs of the comparators in response to a clock signal.

8. The control circuit as claimed in claim 7, wherein the calculator includes a low-pass filter that reduces responsiveness.

9. The control circuit as claimed in claim 8, wherein the low-pass filter has a characteristic of cutting off frequency of the clock signal.

10. A switching power supply comprising:
    a plurality of switching circuit blocks;
    a plurality of output reactors connected in parallel to an associated one of the switching circuit blocks;
    a control circuit that controls a operation of the plurality of switching circuit blocks in accordance with a delta-sigma modulation scheme; wherein:
    the control circuit comprises:
        a voltage control loop that stabilizes an output voltage of the switching power supply; and
        a current control loop that balances the reactor currents flowing through each of the plurality of output reactors without interfering the voltage control loop.

11. The switching power supply as claimed in claim 10, wherein the current control loop performs compensation on the current control loop based on a difference between the reactor currents flowing through the plurality of output reactors and an average value of the reactor currents flowing through the plurality of output reactors.

12. The switching power supply as claimed in claim 11, wherein the current control loop:
    performs compensation on the voltage control loop such that when the reactor current flowing through a stipulated output reactor among the plurality of output reactors is less than the average value, power transmission is increased by the associated switching circuit block, and
    performs compensation on the voltage control loop such that when the reactor current flowing through the stipulated output reactor is greater than the average value, power transmission is decreased by the associated switching circuit block.

13. The switching power supply as claimed in claim 10, wherein a responsiveness of the current control loop is lower than a responsiveness of the voltage control loop.

14. The switching power supply as claimed in claim 11, wherein a responsiveness of the current control loop is lower than a responsiveness of the voltage control loop.

15. The switching power supply as claimed in claim 12, wherein a responsiveness of the current control loop is lower than a responsiveness of the voltage control loop.

16. A switching power supply comprising:
    a plurality of switching circuit blocks;
    a plurality of output reactors connected in parallel to an associated one of the switching circuit blocks;
    a control circuit that uses delta-sigma modulation to control operation of the plurality of switching circuit blocks, wherein:
    the control circuit comprises:
        a calculator that calculates a difference between reactor currents flowing through the plurality of output reactors and an average value of the reactor currents flowing through the plurality of output reactors, respectively;
        a control voltage generator that generates control voltages corresponding to each of the plurality of switching circuit blocks based on the calculated difference and an output voltage of the switching power supply;
        a plurality of comparators that compare the control voltages against a reference voltage; and a plurality of latch circuits that latch the outputs of the comparators in response to a clock signal.

17. The switching power supply as claimed in claim 16, wherein the calculator includes a low-pass filter that reduces responsiveness.

18. The switching power supply as claimed in claim 17, wherein the low-pass filter has a characteristic of cutting off frequency of the clock signal.

* * * * *